(12) United States Patent
Garcia-Arellano et al.

(10) Patent No.: US 12,481,788 B2
(45) Date of Patent: Nov. 25, 2025

(54) METHOD TO RANDOMIZE ONLINE ACTIVITY

(71) Applicant: International Business Machines Corporation, Armonk, NY (US)

(72) Inventors: Christian Garcia-Arellano, Richmond Hill (CA); Matthias Seul, Pleasant Hill, CA (US); Mehran Khan, Ottawa (CA); Daniel Silveira, Toronto (CA); Zvonimir Fras, Markham (CA)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 17/741,521

(22) Filed: May 11, 2022

(65) Prior Publication Data
US 2023/0367855 A1 Nov. 16, 2023

(51) Int. Cl.
G06F 21/62 (2013.01)
G06N 3/08 (2023.01)
G06N 20/00 (2019.01)

(52) U.S. Cl.
CPC ...... G06F 21/6263 (2013.01); G06F 21/6254 (2013.01); G06N 3/08 (2013.01); G06N 20/00 (2019.01)

(58) Field of Classification Search
CPC .......... G06F 21/14; G06F 21/62–6263; G06N 20/00; G06N 3/08
See application file for complete search history.

(56) References Cited

U.S. PATENT DOCUMENTS

| | | | |
|---|---|---|---|
| 8,468,271 B1 | 6/2013 | Panwar | |
| 10,332,108 B2 | 6/2019 | Ciurea | |
| 10,395,017 B2 | 8/2019 | Bender | |
| 12,039,083 B1 * | 7/2024 | Fedele | G06F 16/9538 |
| 2011/0208717 A1 * | 8/2011 | Pierce | G06F 16/951 |
| | | | 707/E17.112 |
| 2012/0297017 A1 | 11/2012 | Livshits | |
| 2013/0282759 A1 * | 10/2013 | Proux | G06F 16/953 |
| | | | 707/774 |

(Continued)

FOREIGN PATENT DOCUMENTS

EP 3063691 B1 3/2020

OTHER PUBLICATIONS

Ahmad, Wasi Uddin, Kai-Wei Chang, and Hongning Wang. "Intent-aware query obfuscation for privacy protection in personalized web search." The 41st international ACM SIGIR conference on research & development in information retrieval. 2018. (Year: 2018).*

(Continued)

*Primary Examiner* — Madhuri R Herzog
(74) *Attorney, Agent, or Firm* — Michael A. Petrocelli (57) ABSTRACT

A computer-implemented method for digital fingerprint obfuscation is disclosed. The computer-implemented method includes training a machine learning model to classify web traffic data into one or more personas. The computer-implemented method further includes identifying, using the trained machine learning model, a particular persona of a user based, at least in part, on a user's real traffic data generated during a current user session. The computer-implemented method further includes generating synthetic traffic data based, at least in part, on the identified particular persona of the user.

20 Claims, 6 Drawing Sheets

(56) References Cited

U.S. PATENT DOCUMENTS

| | | |
|---|---|---|
| 2014/0287723 A1 | 9/2014 | Lafever |
| 2015/0128285 A1 | 5/2015 | Lafever |
| 2015/0128287 A1 | 5/2015 | Lafever |
| 2018/0121677 A1* | 5/2018 | Avancha ............. G06F 21/6245 |
| 2021/0150269 A1* | 5/2021 | Choudhury ........ G06V 30/1985 |
| 2021/0232706 A1* | 7/2021 | Peruski .................. G06N 20/00 |

OTHER PUBLICATIONS

Ahmad, Wasi Uddin, Md Masudur Rahman, and Hongning Wang. "Topic model based privacy protection in personalized web search." Proceedings of the 39th International ACM SIGIR conference on Research and Development in Information Retrieval. 2016. (Year: 2016).*

Sánchez, David, Jordi Castellà-Roca, and Alexandre Viejo. "Knowledge-based scheme to create privacy-preserving but semantically-related queries for web search engines." Information Sciences 218 (2013): 17-30. (Year: 2013).*

Fröbe, Maik, Eric Oliver Schmidt, and Matthias Hagen. "Efficient query obfuscation with keyqueries." IEEE/WIC/ACM International Conference on Web Intelligence and Intelligent Agent Technology. 2021. (Year: 2021).*

Wu, Zongda, et al. "Constructing plausible innocuous pseudo queries to protect user query intention." Information Sciences 325 (2015): 215-226. (Year: 2015).*

Yu, Puxuan, Wasi Uddin Ahmad, and Hongning Wang. "Hide-n-seek: An intent-aware privacy protection plugin for personalized web search." The 41st International ACM SIGIR Conference on Research & Development in Information Retrieval. 2018. (Year: 2018).*

"Privacy Badger", downloaded from the Internet on Mar. 3, 2022, 15 pages, <https://privacybadger.org/>.

"Privacy Possum", downloaded from the Internet on Mar. 3, 2022, 6 pages, <https://github.com/cowlicks/privacypossum>.

"Unified ID 2.0", Industry Initiatives, theTradeDesk, downloaded from the Internet on Mar. 7, 2022, 9 pages, <https://www.thetradedesk.com/us/about-us/industry-initiatives/unified-id-solution-2-0>.

"What is a digital footprint? And how to help protect it from prying eyes", Oct. 15, 2018, <https://us.norton.com/internetsecurity-privacy-clean-up-online-digital-footprint.html>, 5 pages.

"Your ISP Is Tracking Every Website You Visit: Here's What We Know", Last updated on Nov. 15, 2021 by PrivacyPolicies.com Legal Writing Team, 11 pages, <https://www.privacypolicies.com/blog/isp-tracking-you/>.

Mell et al., "The NIST Definition of Cloud Computing", Recommendations of the National Institute of Standards and Technology, NIST Special Publication 800-145, Sep. 2011, 7 pages.

Nair, Lenin VJ, "How to Track Link Clicks on Your Website Using Google Analytics & Google Tag Manager," zoomowl, 2018, (Online), Available: https://www.zoomowl.com/link-click-tracking-using-googleanalytics/, (Accessed Nov. 5, 2020).

Rainie, et al., "Anonymity, Privacy, and Security Online", Pew Research Center; Sep. 5, 2013, 8 pages, <https://www.pewresearch.org/internet/2013/09/05/anonymity-privacy-and-security-online/>.

Xia et al., "Mosaic: Quantifying Privacy Leakage in Mobile Networks", SIGCOMM'13, Aug. 12-16, 2013, Hong Kong, China, 12 pages.

Balaban, "DNS Queries and Their Anonymity", Hackernoon, Aug. 28, 2018, 9 pages, https://hackernoon.com/dns-queries-and-their-anonymity-70cc82fbc60a.

Bhalerao et al., "A Survey on User Navigation Pattern Prediction from Web Log Data", IJCSE International Journal of Computer Sciences and Engineering, vol. 3, Issue-5, May 30, 2015, pp. 133-137.

Brave Help Center, "What is "Shields"?", accessed on Jun. 3, 2024, 3 pages, https://support.brave.com/hc/en-us/articles/360022973471-What-is-Shields.

Davies, "WTF are shared identity solutions?", Digiday, Sep. 23, 2019, 6 pages, https://digiday.com/media/what-are-shared-identity-solutions-and-can-they-really-replace-cookies/.

Hasan et al., "Learning and Predicting Key Web Navigation Patterns Using Bayesian Models", ICCSA 2009, Part II, LNCS 5593, pp. 877-887, 2009.

Nield, "It's Time to Switch to a Privacy Browser", Wired, Apr. 6, 2024, 10 pages.

PhantomJS, "Scriptable Headless Browser", accessed Jun. 3, 2024, 1 page, https://phantomjs.org/.

PhantomJS, "Who's using PhantomJS?", accessed on Jun. 3, 2024, 2 pages, https://phantomjs.org/users.html.

Privacy Policies, "Your ISP Is Tracking Every Website You Visit: Here's What We Know", Blog, Last updated on Jul. 1, 2022, 11 pages, https://www.privacypolicies.com/blog/isp-tracking-you/.

ScrambleSuit, "A Polymorphic Network Protocol to Circumvent Censorship", Last change: Apr. 11, 2016, 1 page.

Wikibooks, "Intellectual Property and the Internet/Anonymizers", accessed on Jun. 3, 2024, 4 pages, https://en.wikibooks.org/wiki/Intellectual_Property_and_the_Internet/Anonymizers.

Zoomowl, "How to Track Link Clicks on Your Website Using Google Analytics & Google Tag Manager", Feb. 17, 2018, 31 pages, https://www.zoomowl.com/link-click-tracking-using-googleanalytics/.

* cited by examiner

METHOD TO RANDOMIZE ONLINE ACTIVITY

BACKGROUND

The present invention relates generally to the field of digital fingerprints, and more particularly to, obfuscating a digital fingerprint.

A digital fingerprint (i.e., online fingerprint, browser fingerprint, or device fingerprint), refers to the tracking techniques that websites use to collect information from a user. Cookies (i.e., HTTP cookie) are small blocks of data created by a web server while browsing a website and placed on the user's computer or other device by the user's web browser. Cookies are placed on the device used to access a website, and more than one cookie may be placed on a user's device during a session. ISPs track a user's online activities to commercialize them and provide privacy as a premium service. DNS track a user's online presence or preference via private IP-domain name resolution sets. It is also possible to track interest via clicks or previously visited websites. Fingerprinting through tracking users' online activity on social media (posts, likes and online advertisement interest), and user identification via metadata aggregation can use also for commercial purposes.

SUMMARY

According to one embodiment of the present invention, a computer-implemented method for digital fingerprint obfuscation is disclosed. The computer-implemented method includes training a machine learning model to classify web traffic data into one or more personas. The computer-implemented method further includes identifying, using the trained machine learning model, a particular persona of a user based, at least in part, on a user's real traffic data generated during a current user session. The computer-implemented method further includes generating synthetic traffic data based, at least in part, on the identified particular persona of the user.

According to another embodiment of the present invention, a computer program product for digital fingerprint obfuscation is disclosed. The computer program product includes one or more computer readable storage media and program instructions stored on the one or more computer readable storage media. The program instructions include instructions to train a machine learning model to classify web traffic data into one or more personas. The program instructions further include instructions to identify, using the trained machine learning model, a particular persona of a user based, at least in part, on a user's real traffic data generated during a current user session. The program instructions further include instructions to generate synthetic traffic data based, at least in part, on the identified particular persona of the user.

According to another embodiment of the present invention, a computer system for digital fingerprint obfuscation is disclosed. The computer system includes one or more computer processors, one or more computer readable storage media, and computer program instructions, the computer program instructions being stored on the one or more computer readable storage media for execution by the one or more computer processors. The program instructions include instructions to train a machine learning model to classify web traffic data into one or more personas. The program instructions further include instructions to identify, using the trained machine learning model, a particular persona of a user based, at least in part, on a user's real traffic data generated during a current user session. The program instructions further include instructions to generate synthetic traffic data based, at least in part, on the identified particular persona of the user.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of digital fingerprints, and more particularly to, obfuscating a digital fingerprint.

As the internet evolves, companies continue to increasingly "fingerprint" users' online activity to be able to understand current and future customer trends and needs. The information they are able to collect about people, their activities, their search histories, and their relationships and interactions with other people has become a fundamental way to give them a competitive advantage over their competitors.

However, there is a strong desire from the individual users standpoint to remain anonymous, at least occasionally. Many users have taken steps online to remove or mask their digital footprints. There are a large number of existing technologies that have been developed to allow users to retain some anonymity online, such as cookies, ISPs, and DNS. However, cookies have become highly regulated and there have been attempts to standardize cookies through a Unified ID solution to simplify the tracking by having a single shared cookie. Typically, ISPs are a premium service a user must pay for. Embodiments of the present invention recognize many users desire to remain anonymous or make their data unidentifiable.

Current methods for providing internet anonymity include dynamic de-identification and anonymity, mobile applications for dynamic de-identification and anonymity, systems and methods to protect user privacy, and providing privacy within computer networks using anonymous cookies. Dynamic de-identification and anonymity anonymizes data so that the collected data cannot be connected to the user who produced the data. Mobile applications for dynamic de-identification and anonymity allow a user to select what data they want to be anonymized (e.g., confidential policies) and the ability to add other users to see that anonymized data when granted the correct permissions. Systems and methods to protect user privacy protects the privacy of a user by establishing a portal between the user and the merchant system. Further, it acts as a filter for data so that the collector does not receive certain data that indicated by the user. Anonymous cookies keep a user anonymous by providing a visiting site with an anonymous set of cookies rather than ones that are present in the user's computer which are used to identify the user.

Embodiments of the present invention recognize the desire for a user to stay anonymous while online. Embodiments of the present invention actively feed web trackers misleading information in one or more ways in order to anonymize a user's actual web traffic. In an embodiment, the present invention provides for anonymizing a user's actual web traffic by stripping tracking information from original requests. In an embodiment, the present invention provides for receiving a request for identifiable information and sending both real and synthetic data to the web tracker. In an embodiment, the present invention provides for luring web trackers to the generated synthetic traffic and inaccurate information is returned to the web tracker.

Embodiments of the present invention use machine learning algorithms to classify and generate synthetic (i.e., artificial) online activity which can be weaved between a user's real world online activity in order to prevent collectors and/or processors from being able to generate an accurate behavioral identity of the user. Embodiments of the present invention includes three phases: acquisition, curation, and generation. The acquisition phase includes acquiring training data to classify a user's web traffic. The curation phase includes training an algorithm to classify the acquired training data collected form the acquisition phase into "online personas." The generation phase includes generating synthetic traffic based on the online personas obtained from the curation phase. In an embodiment, synthetic data is generated from neutral personas, polar opposite persons, and random or unrelated personas. In an embodiment, synthetic data from neutral persons includes personas that are not polar opposite but are also not characteristically too close to the user's real persona. In an embodiment, synthetic data from polar opposite personas includes personas that are polar opposite than the user's real persona. In an embodiment, synthetic data generated from random or unrelated personas includes a mixture of personas between the neutral and polar opposite phases.

In an example, a tracker sends a request but is stripped out preventing identifiable information to be returned which hinders the tracker's ability to effectively monitor a user's online activity. In a second example, a tracker sends a request and receives identifiable information and conflicting advertiser IDs attached. Here, the tracker receives conflicting user information from synthetic traffic data and therefor fails to effectively monitor user activity. In a third example, a tracker is lured to generated traffic and only inaccurate information from synthetic traffic data is returned. In this example, the tracker is lured away from the actual user's identify and is unaware of the original user's online activity, and in turn is ineffective in tracking. Moreover, all trackers relying on the deceived tracker's information are also lured away from the original users data.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
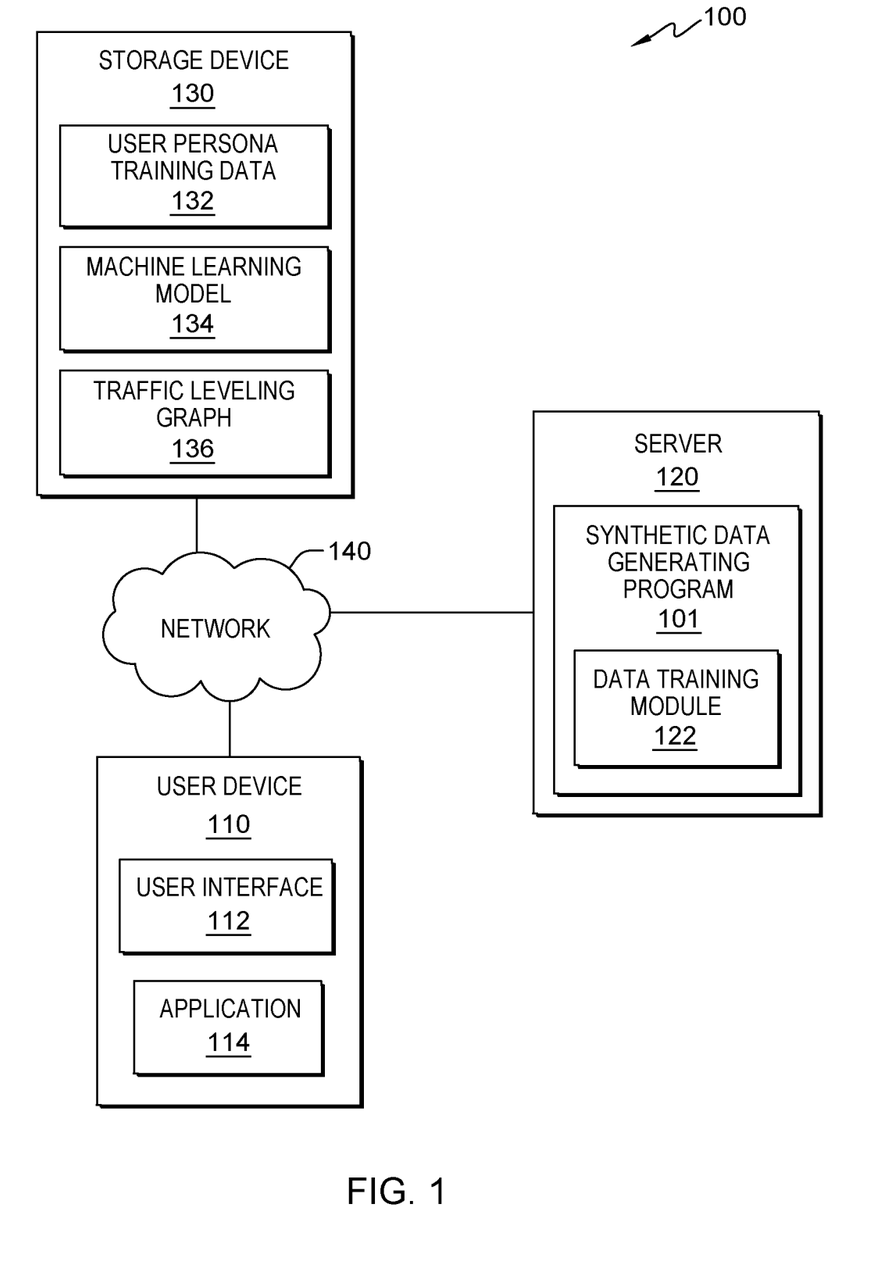
FIG. 1 is a block diagram of a network computing environment for synthetic data generating program 101, generally designated 100, in accordance with at least one embodiment of the present invention.

The present invention will now be described in detail with reference to the Figures. FIG. 1 is a functional block diagram of a network computing environment for synthetic data generating program 101, generally designated 100, in accordance with at least one embodiment of the present invention. In an embodiment, network computing environment 100 may be provided by cloud computing environment 50, as depicted and described with reference to FIG. 5, in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Network computing environment 100 includes user device 110, server 120, and storage device 130 interconnected over network 140. User device 110 may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In general, user device 110 can represent any programmable electronic device or combination of programmable electronic devices capable of executing machine readable program instructions and communicating with server 120, storage device 130, and other devices (not depicted) via a network, such as network 140. User device 110 can include internal and external hardware components, as depicted and described in further detail with respect to FIG. 4.

User device 110 further includes user interface 112 and application 114. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on user device 110. In an embodiment, application 114 is representative of one or more applications (e.g., social media applications, web applications, and email applications) located on user device 110. In various example embodiments, application 114 can be an application that a user of user device 110 utilizes to browse the web, internet, social media, or any other web traffic enabling use. In an embodiment, application 114 can be a client-side application associated with a server-side application running on server 120 (e.g., a client-side application associated with for synthetic data generating program 101). In an embodiment, application 114 can operate to perform processing steps for synthetic data generating program 101 (i.e., application 114 can be representative of synthetic data generating program 101 operating on user device 110).

Server 120 is configured to provide resources to various computing devices, such as user device 110. For example, server 120 may host various resources, such as synthetic data generating program 101, further comprising data training module 122, that are accessed and utilized by a plurality of devices. In various embodiments, server 120 is a computing device that can be a standalone device, a management server, a web server, an application server, a mobile device, or any other electronic device or computing system capable of receiving, sending, and processing data. In an embodiment, server 120 represents a server computing system utilizing multiple computers as a server system, such as in a cloud computing environment. In an embodiment, server 120 represents a computing system utilizing clustered computers and components (e.g., database server computer, application server computer, web server computer, webmail server computer, media server computer, etc.) that act as a single pool of seamless resources when accessed within network computing environment 100. In general, server 120 represents any programmable electronic device or combination of programmable electronic devices capable of executing machine readable program instructions and communicating with each other, as well as with user device 110, storage device 130, and other computing devices (not shown) within network computing environment 100 via a network, such as network 140.

Figure 4:
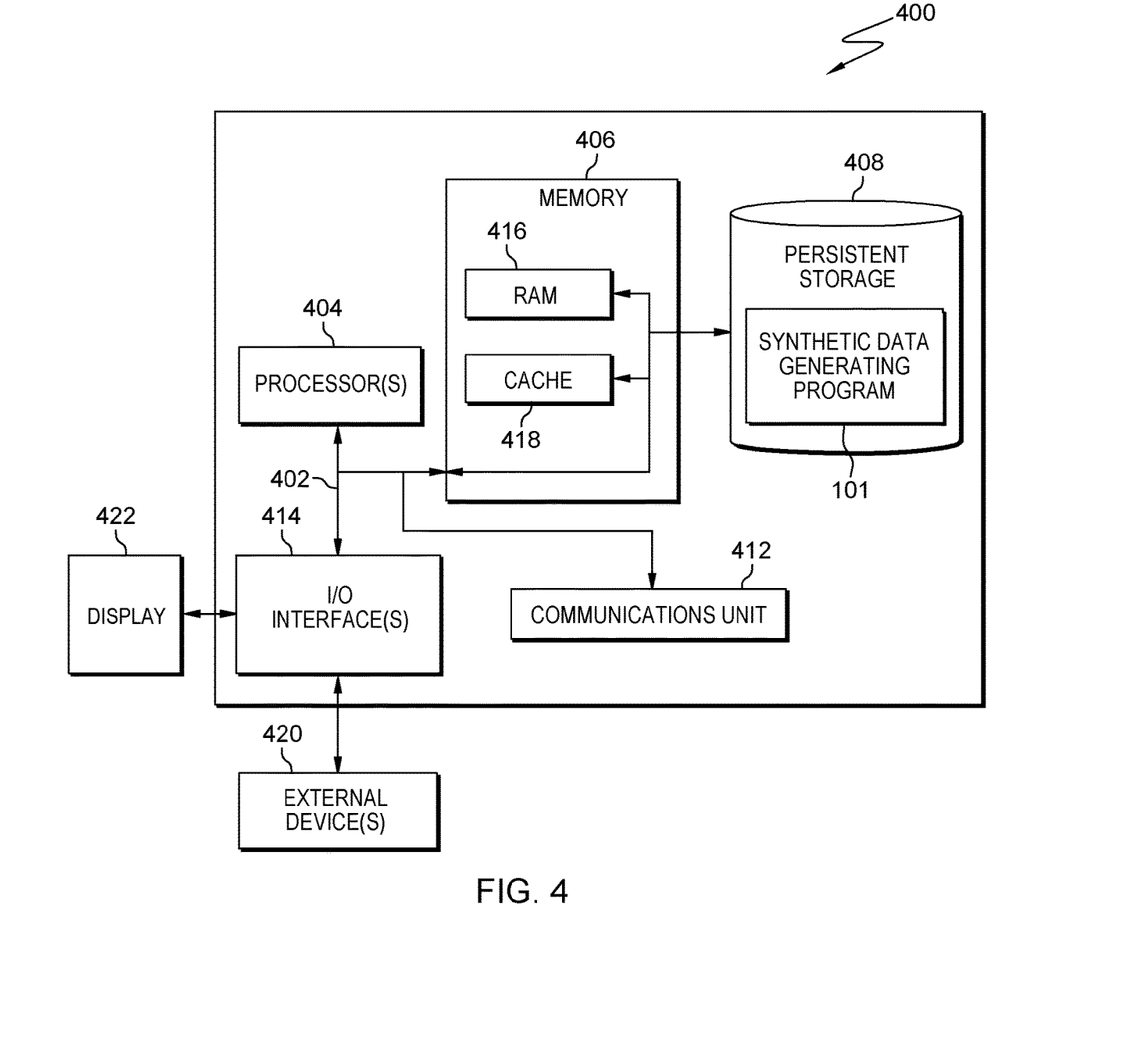
FIG. 4 is a block diagram depicting components of a computer, generally designated 400, suitable for executing a synthetic data generating program 101, in accordance with at least one embodiment of the present invention.
Figure 5:
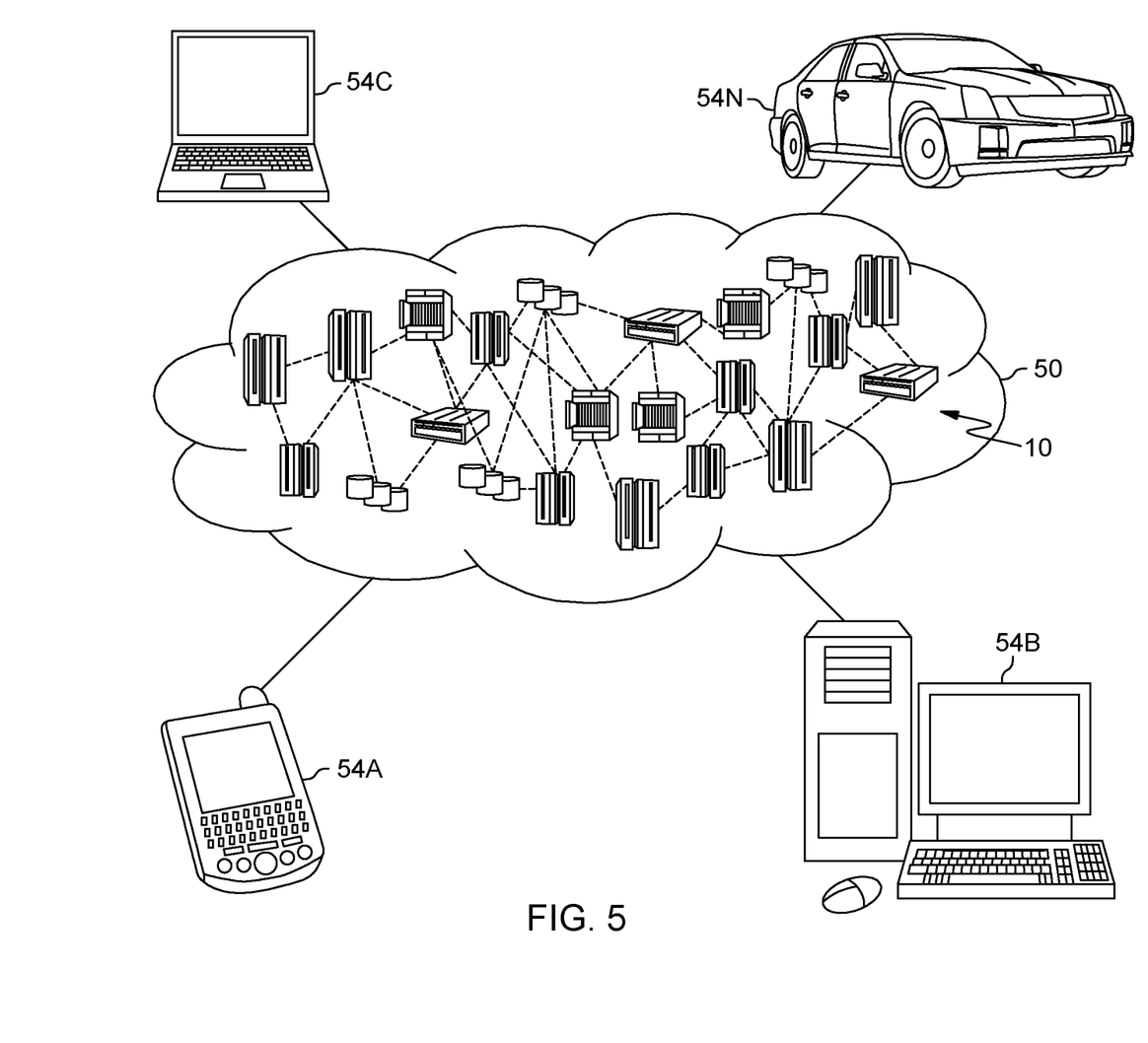
FIG. 5 is a block diagram depicting a cloud computing environment 50 in accordance with at least one embodiment of the present invention.

Server 120 may include components as depicted and described in detail with respect to cloud computing node 10, as described in reference to FIG. 5, in accordance with at least one embodiment of the present invention. Server 120 may include components, as depicted and described in detail with respect to computing device 400 of FIG. 4, in accordance with at least one embodiment of the present invention.

In an embodiment, data training module 122 is a machine learning algorithm used to train machine learning model 134 to classify data into one or more user personas. For example, a persona is an online persona that is classified based on types of web traffic. In an embodiment, data training module 122 trains machine learning model 134 using web traffic data collected during the acquisition phase. The resulting output of machine learning model 134 is a particular type or types of classification or persona of a user. These labeled personas are then used in the generation phase.

In various embodiments, storage device 130 is a secure data repository for persistently storing user persona training data 132, machine learning model 134, and traffic leveling graph 136, utilized by various applications and user devices of a user, such as synthetic data generating program 101 and user device 110, respectively. Storage device 130 may be implemented using any volatile or non-volatile storage media known in the art for storing data. For example, storage device 130 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 130 may be implemented with any suitable storage architecture known in the art, such as a relational database, an object-oriented database, or one or more tables.

In an embodiment, synthetic data generating program 101 may be configured to access various data sources, such as user persona training data 132, machine learning model 134, and traffic leveling graph 136, that may include personal data, content, contextual data, or information that a user does not want to be processed. Personal data includes personally identifying information or sensitive personal information as well as user information, such as location tracking or geo-location information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, synthetic data generating program 101 enables the authorized and secure processing of personal data. In an embodiment, synthetic data generating program 101 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, synthetic data generating program 101 provides information regarding personal data and the nature (e.g., type, scope, purpose, duration, etc.) of the processing. In an embodiment, synthetic data generating program 101 provides a user with copies of stored personal data. In an embodiment, synthetic data generating program 101 allows for the correction or completion of incorrect or incomplete personal data. In an embodiment, synthetic data generating program 101 allows for the immediate deletion of personal data.

Storage device 130 includes user persona training data 132, machine learning model 134, and traffic leveling graph 136. In an embodiment, user persona training data 132 includes the data, such as web traffic data collected from the acquisition phase for a particular user. For example, the data includes user web traffic or a record of websites, applications, or other platforms utilized on the device or by the user, user click data, or any type of information that can be gathered with respect to a user's interaction with a device or the internet. In an embodiment, user persona training data 132 includes the time a website or application was utilized or accessed, a number of times a user visited a particular website or utilized an application, the amount of time a user visited a particular website or utilized an application, etc. For example, if social media A application was utilized from 5:00-5:05 pm, this information is recorded and stored in user persona training data 132.

In an embodiment, machine learning model 134 is a trained machine learning model that classifies data into one or more particular user personas. In an embodiment, synthetic data generating program 101 receives a user's data, such as web traffic data collected from the acquisition phase, and classifies the user data into one or more personas. In an embodiment, synthetic data generating program 101 groups similar data together to determine a persona for the received data. In an embodiment, personas are determined by URLs or category of URLs. In an embodiment, synthetic data generating program 101 expresses a user's browsing pattern with a combination of browsing personas. For example, synthetic data generating program 101 groups social media and query data both pertaining to "cooking" in one group, and groups social media and query data both pertaining to "live sports" in another group. In an embodiment, synthetic data generating program 101 determines one or more personas from these groupings. From the previous example, synthetic data generating program 101 determines that the particular user has a persona of cooking and watching sports.

In an embodiment, traffic leveling graph 136 is a visualization of data on the levels of traffic patterns. In an embodiment, traffic patterns are anonymized by traffic leveling. Traffic leveling can be used to generate a complimentary frequency of automated traffic to level or flatten a user's original traffic volume curve plotted against time and volume. In an embodiment, traffic level graphs are generated by synthetic data generating program 101 and include real world traffic and generated or artificial traffic.

In an embodiment, synthetic data generating program 101 uses machine learning algorithms to classify and generate realistic synthetic online activities that can then be weaved between a user's online activity in order to prevent data collectors or processors from being able to generate an accurate behavioral identity of the user. In an embodiment, synthetic data generating program 101 obfuscates a user's online fingerprint by performing three phases: the acquisition phase, the curation phase, and the generation phase. In an embodiment, the acquisition phase includes acquiring training data to classify a user's web traffic. In an embodiment, the curation phase includes training a machine learning model to classify the acquired training data collected from the acquisition phase into "online personas." In an embodiment, the generation phase includes generating synthetic traffic based on the online personas obtained from the curation phase.

In an embodiment, synthetic data generating program 101 executes the acquisition phase at regular intervals. In an embodiment, during the acquisition phase, synthetic data generating program 101 collects data from online sources as well as from the users' web activity. This can include, but not exclusive to the user's active time of day, pages, visited, web browsers identified, applications accessed, as well as local contents present in the users' web browser or computer. In an embodiment, the source of the training data can be any combination of sources that brokers or aggregates online user activity or synthetic data generating program 101 user data. For example, user traffic data can come from advertisement cohorts, commercial data brokers, proxy servers, proxy harvesting, tor exit nodes, query searches, application usage, or other forms of collecting data. In an embodiment, the training data acquired or received is sanitized. In an embodiment, sanitizing the training data comprises stripping the data of any information that directly identifies source individuals. In an embodiment, synthetic data generating program 101 collects and marks the user traffic data to run classification algorithms to generate a "base-persona." In an embodiment, a base persona is the base or main attributes connected to a user with similar traits, likes, or dislikes from the user traffic data. In an embodiment, synthetic data generating program 101 stores the collected data in user persona training data 132.

In an embodiment, following the acquisition phase, synthetic data generating program 101 executes the curation phase. In the curation phase, synthetic data generating program 101 trains a machine learning model to classify the traffic data collected from the acquisition phase. In an embodiment, synthetic data generating program 101, via the trained machine learning model, classifies the traffic data into one or more online personas. In an embodiment, during the curation phase, synthetic data generating program 101 generates an output of a number of classifications or personas that include the ones from the users of the system. In an embodiment, synthetic data generating program 101 receives the user traffic data and classifies the user traffic data into one or more personas. For example, a persona or persona cluster is a type of individual that shares a set of common attributes. For example, synthetic data generating program 101 classifies data based on personas having similar traits. Such as, cooking and baking are similar traits. Meaning a user who frequently query searches cooking recipes will likely have a similar persona to another user who frequently query searches baking recipes. In an embodiment, synthetic data generating program 101 generates a conceptual table of personas mapped against their set of URLs, category of URLs or category of traffic data information. For example, Social Media Application A is categorized under "social media" or a search query of "how long to cook salmon" is categorized under "baking and cooking." During the curation phase, synthetic data generating program 101 determines a user's browsing pattern with a combination of browsing personas. For example, synthetic data generating program 101 determines a user's likes or dislikes. For example, synthetic data generating program 101 may determine that a user online shopping for dog treats either owns, has, or likes dogs. In such example, synthetic data generating program 101 classifies this user with other users who like dogs, own a dog, or also online shop for dog treats. In an embodiment, the labeled personas are fed into the generation phase for traffic generation and/or traffic leveling.

In an embodiment, following the curation phase, synthetic data generating program 101 enters the generation phase. In the generation phase, synthetic data generating program 101 generates synthetic traffic based on the determined personas or base persona obtained from the curation phase. For example, the generated synthetic traffic represents artificial web traffic in order to obfuscate the user's real web browsing patterns. For example, if all web traffic data, both real and artificial, are graphed with respect time on the x axis and web traffic data on the y axis, it would be difficult to identify the user's real online fingerprint. In the generation phase, synthetic data generating program 101 generates synthetic traffic based on a persona different from the user's determined persona from the curation phase. In an embodiment, synthetic data generating program 101 generates synthetic traffic based on time stamp frequency of the user's real traffic. For example, if the user is mostly active in the morning and at night, synthetic data generating program 101 generates synthetic traffic for mid-day.

In an embodiment, synthetic data generating program 101 determines a classification score for a persona. For example, similar personas have similar scores, and polar opposite personas have polar opposite scores. For example, personas for fashion, online shopping, and clothes will have similar scores and personas for cooking, baking, and online recipes will have similar scores. However, the score for online shopping and online recipes will have polar opposite scores since they are not similar. In an embodiment, synthetic data generating program 101 generates synthetic traffic associated with a persona that is the polar opposite to the user traffic data. In an embodiment, synthetic data generating program 101 determines a neutral persona is a persona with a score X and a polar opposite persona is a score above X. In an embodiment, synthetic data generating program 101 determines a polar opposite persona has a persona score difference above a predetermined threshold. For example, if it is determined the current user is a "cooking" persona is scored a 0, a polar opposite persona has a persona score difference above 5, and "baking" persona is scored a 1, and "skydiving" persona is scored a 10, synthetic data generating program 101 determines "skydiving" persona is a polar opposite persona to "cooking" since their persona score difference is 9.

In an embodiment, synthetic data generating program 101 generates synthetic traffic associated with a person that is complimentary to the user traffic data. A complimentary persona is a set of attributes that are shared by or complimentary to another persona. In an embodiment, a complimentary persona is a neutral persona. In an embodiment, synthetic data generating program 101 determines a neutral persona is a persona with a score X and the users persona is also of score X or below a predetermined threshold. For example, if it is determined the current user is a "cooking" persona is scored a 0, a complementary persona has a persona score difference below 2, and "baking" persona is scored a 1, synthetic data generating program 101 "baking" persona is a complementary persona to "baking" since the score difference of 1 is below the predetermined threshold of 2.

In an embodiment, synthetic data generating program 101 determines the difference between two or more persona scores. For example, if one user is a "golf" persona, and another user is a "tennis" persona, the difference between their persona scores will be low since golf and tennis are both sports and sports typically played by the same type of person. In another example, if one user is a "golf" persona, and another user is a "hunting" persona, the difference between their persona scores will be high since golf and hunting are not activities typically carried out by the same type of person.

In an embodiment, synthetic data generating program 101 generates artificial traffic associated with a neutral persona. Here, the persona which synthetic data is generated from is not opposite, but also not a persona that is characteristically close to the users identified persona. For example, a neutral persona tied to reading and books might be a persona consisting of items such as gardening or fitness. In this example, synthetic data generating program 101 generates faux traffic from a persona of gardening or fitness. In an embodiment, synthetic data generating program 101 generates artificial traffic associated with personas below a predetermined classification score difference threshold. For example, if the predetermined classification score difference for neutral personas threshold is below 3, and users determined persona is "reading" with score 5 and "gardening" persona is 7, the classification score difference is 2 and synthetic data generating program 101 determines "gardening" is a neutral persona to "reading." Further, synthetic data generating program 101 generates faux traffic for a persona of gardening.

In an embodiment, synthetic data generating program 101 generates traffic from a polar opposite persona. In these embodiments, synthetic data generating program 101 generates traffic from a persona that is polar opposite from the users identified persona. For example, a user identified persona of vegetarian cooking and gardening may have a determined polar opposite persona of meat curing and BBQing. In this example, synthetic data generating program 101 generates false traffic from a persona of meat curing and BBQing. In an embodiment, a persona will be a polar opposite persona from the user if a classification score difference between the users persona and another persona are above a predetermined threshold. In an embodiment, synthetic data generating program 101 generates artificial traffic associated with polar opposite personas having a classification score difference to the users identified persona above a predetermined threshold. For example, if the predetermined classification score difference for polar opposite personas threshold is above 5, and users determined persona is "vegetarian food" with score 5 and "BBQing" persona is 12, the classification score difference is 7 and synthetic data generating program 101 determines "BBQing" is a polar opposite persona to "vegetarian food." Further, synthetic data generating program 101 generates false traffic for a persona of BBQing.

In an embodiment, synthetic data generating program 101 generates web traffic from a different or same persona. In these embodiments, synthetic data generating program 101 generates traffic from a mixture of any persona between neutral and polar opposite personas. For example, synthetic data generating program 101 generates traffic from 40% from a neutral persona, 40% from an polar opposite persona, and 20% from a random persona.

An individual's surfing behavior reveals their productive vs. non-productive times over day/week/month and, can be useful information for any eavesdropper. In an embodiment, synthetic data generating program 101 performs traffic leveling to anonymize a user's real world or actual traffic patterns. In an embodiment, synthetic data generating program 101 generates a complimentary frequency of automated or synthetic traffic data to level or flatten a user's original traffic volume curve plotted against time and volume. Generating complimentary frequencies of automated or synthetic traffic data offsets the user's real world or actual web traffic. In an embodiment, synthetic data generating program 101 performs traffic leveling on the generated synthetic traffic during a current user session, wherein the traffic leveling includes transmitting the generated synthetic traffic data that is complementary or polar opposite to the user traffic data. A current user session can include in real time as the user is generating real user traffic data.

In an embodiment, synthetic data generating program 101 generates synthetic data while the user is generating real data. For example, synthetic data generating program 101 generates synthetic data for a neutral persona while the user is scrolling on a social media feed on their user device. In an embodiment, synthetic data generating program 101 generates synthetic data at a time other than while the user is generating real data. For example, the user query searches for "easy dinner recipes" on their user device and synthetic data generating program 101 generates synthetic data for a neutral persona at a later time. In an embodiment, synthetic data generating program 101 transfers synthetic data simultaneously when the real data is transferred. In an embodiment, synthetic data generating program 101 transfers synthetic data at a time other than when the real data is transferred. For example, the real data is transferred and at a later time the synthetic data is transferred.

In an embodiment, synthetic data generating program 101 generates and analyzes traffic that includes a user's real world traffic volume (plotted as KB/second with respect to the y-axis) over time (plotted as requests/second with respect to the x-axis In an embodiment, synthetic data generating program 101 generates complimentary offset traffic, adjusting over time and volume axis. In an embodiment, synthetic data generating program 101 avoids detection by infusing the generated traffic with a weighted mixture of different interests or personas. In an embodiment, synthetic data generating program 101 deliberately generates or transmits synthetically generated traffic random to avoid hot or automation detection.

In an embodiment, synthetic data generating program 101 actively sends web trackers misleading or artificial web traffic information. In an embodiment, synthetic data generating program 101 strips tracking information from the original request, such as by tracking URL lists or other ways. In an embodiment, synthetic data generating program 101 lures trackers to the generated synthetic traffic by enabling cookies, referrers, ensuring tracking IDs are intact or added intentionally. In an embodiment, synthetic data generating program 101 injects or attaches conflicting advertising IDs into generated requests to further confuse or hinder the creation of coherent advertising profiles.

In another embodiment of the present invention, a method for obfuscating an online fingerprint of a user is provided. The method includes, in an acquisition phase, acquiring training data. In an embodiment, the acquired training data includes data associated with, but not limited to, one or more of the active time of day of an online user session, web pages visited by a user, web browser activity of a user, and application activity of a user. In an embodiment, web traffic collected from the training data is classified at predetermined intervals. The method further includes, in a curation phase, training a machine learning model to classify the training data collected in the acquisition phase by clustering search patterns and queries into multiple persona clusters representing online personas. The method further includes, in response to training the machine learning model, classifying new data collected from the acquisition phase fed to the trained machine learning model to classify the new data into personas to create a number of labeled personas including the personas from one or more users. the method further includes, in a generation phase, generating synthetic traffic using the personas obtained in the curation phase to form a curated web surfing pattern. In an embodiment, the synthetic traffic and/or the curated web surfing pattern is formed based, at least in part, on one or more of information associated with a respective user, respective browsing habits and persona(s). In an embodiment, the synthetic traffic and/or the curated web surfing pattern includes a mixture of universal resource locators (URLs) from neutral personas, URLs from polar opposite personas and URLs that are seemingly random or unrelated to a identified user persona. The method further includes anonymizing a respective traffic pattern of a user by traffic leveling using the generated synthetic traffic. In an embodiment, traffic leveling includes creating a complimentary frequency of automated traffic to level an original traffic volume curve of a respective user plotted against time/volume. In an embodiment, traffic leveling includes actively feeding web trackers false or misleading information. In an embodiment, traffic leveling includes stripping tracking information from original user requests, luring traffic trackers to generated synthetic traffic by enabling cookies. In an embodiment, traffic leveling includes injecting/attaching conflicting advertising identifiers into generated requests to further confuse/hinder creation of a coherent advertising profile associated with the respective user.

Figure 2:
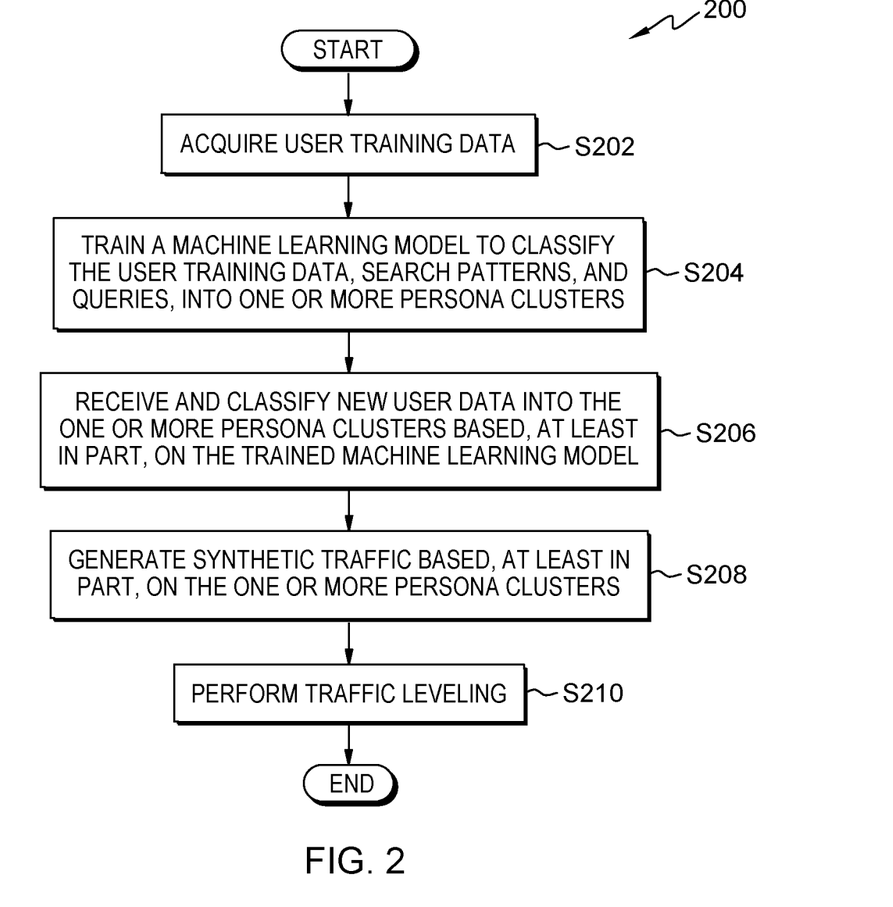
FIG. 2 is a flow chart diagram depicting operational steps for a synthetic data generating program 101, generally designated 200, in accordance with at least one embodiment of the present invention.

FIG. 2 is a flow chart diagram depicting operational steps for synthetic data generating program 101, generally designated 200, in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, synthetic data generating program 101 acquires user persona training data 132. In an embodiment, acquiring user persona training data 132 includes synthetic data generating program 101 performing the acquisition phase as previously described above. In an embodiment, user persona training data 132 includes, but is not limited to, active time of day of a user's web browsing history, web pages visited, web browsers accessed, applications accessed, as well as local contents present in the users' web browser or computer.

At step S204, synthetic data generating program 101 trains a machine learning model to classify the user training data, search patterns, and queries, into one or more persona clusters.

At step S206, synthetic data generating program 101 receives and classifies new user data into the one or more persona clusters based, at least in part, on the trained machine learning model.

At step S208, synthetic data generating program 101 generates synthetic traffic based, at least in part, on the one or more persona clusters. In an embodiment, synthetic data generating program 101 generates synthetic traffic for neutral personas, polar opposite personas, complementary personas, or random personas.

At step S210, synthetic data generating program 101 performs traffic leveling. In an embodiment, synthetic data generating program 101 generates complimentary frequency of automated traffic to level or flatten a user's original traffic volume curve plotted against time vs volume. In an embodiment, synthetic data generating program 101 interjects generated traffic with the users real web traffic. In an embodiment, synthetic data generating program 101 transmits the generated traffic with the user's real web traffic. For example, synthetic data generating program 101 transmits both the user's real web traffic and generated neutral persona traffic. In an embodiment, synthetic data generating program 101 transmits only the generated synthetic traffic.

Figure 3:
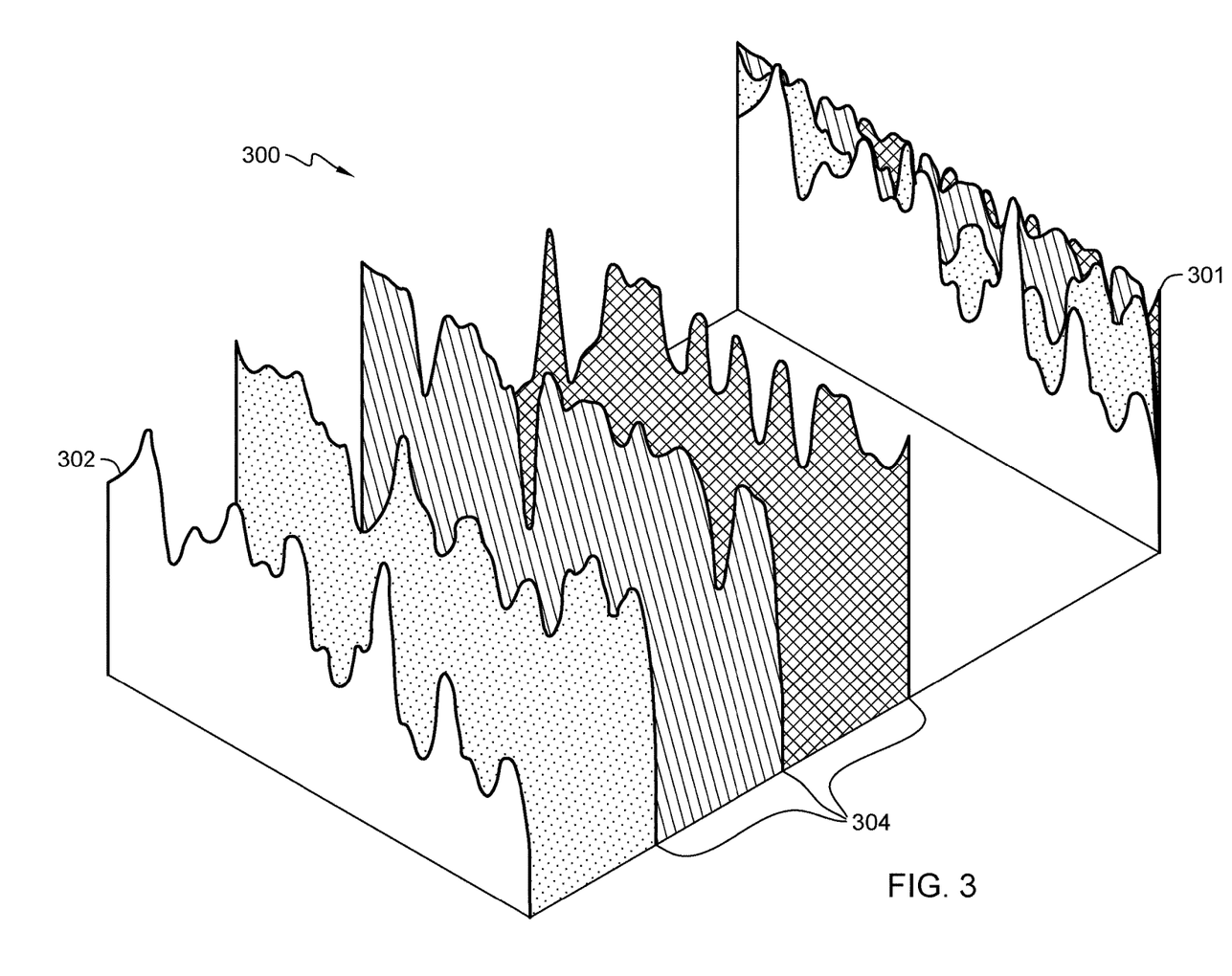
FIG. 3 depicts a traffic leveling graph, generally designated 300, in accordance with at least one embodiment of the present invention.

FIG. 3 depicts a traffic leveling graph, generally designated 300, in accordance with at least one embodiment of the present invention. As depicted, traffic leveling graph 300 represents a volume curve plotted against time vs. volume. Real traffic 302 is the real traffic generated from a user. Generated traffic 304 is the generated synthetic traffic from the generation phase. Real traffic 302 and generated traffic 304 are combined and plotted together to generate traffic leveling graph 301. For example, generated traffic 304 is generated as a polar opposite persona to the user's actual web traffic. Synthetic data generating program 101 then adds the generated polar opposite persona traffic to the real user web traffic data and sends all data in order to avoid or anonymize detection of the user's actual web traffic.

FIG. 4 is a block diagram depicting components of a computing device, generally designated 400, suitable for synthetic data generating program 101 in accordance with at least one embodiment of the invention. Computing device 400 includes one or more processor(s) 404 (including one or more computer processors), communications fabric 402, memory 406 including, RAM 416 and cache 418, persistent storage 408, which further includes synthetic data generating program 101, communications unit 412, I/O interface(s) 414, display 422, and external device(s) 420. It should be appreciated that FIG. 4 provides only an illustration of one embodiment and does not imply any limitations with regard to the environments in which different embodiments may be implemented. Many modifications to the depicted environment may be made.

As depicted, computing device 400 operates over communications fabric 402, which provides communications between computer processor(s) 404, memory 406, persistent storage 408, communications unit 412, and input/output (I/O) interface(s) 414. Communications fabric 402 can be implemented with any architecture suitable for passing data or control information between processor(s) 404 (e.g., microprocessors, communications processors, and network processors), memory 406, external device(s) 420, and any other hardware components within a system. For example, communications fabric 402 can be implemented with one or more buses.

Memory 406 and persistent storage 408 are computer readable storage media. In the depicted embodiment, memory 406 includes random-access memory (RAM) 416 and cache 418. In general, memory 406 can include any suitable volatile or non-volatile computer readable storage media.

Program instructions for synthetic data generating program 101 can be stored in persistent storage 408, or more generally, any computer readable storage media, for execution by one or more of the respective computer processor(s) 404 via one or more memories of memory 406. Persistent storage 408 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 can include one or more network interface cards. Communications unit 412 may provide communications through the use of either or both physical and wireless communications links. In the context of some embodiments of the present invention, the source of the various input data may be physically remote to computing device 400 such that the input data may be received, and the output similarly transmitted via communications unit 412.

I/O interface(s) 414 allows for input and output of data with other devices that may operate in conjunction with computing device 400. For example, I/O interface(s) 414 may provide a connection to external device(s) 420, which may be as a keyboard, keypad, a touch screen, or other suitable input devices. External device(s) 420 can also include portable computer readable storage media, for example thumb drives, portable optical or magnetic disks, and memory cards. Software and data used to practice embodiments of the present invention can be stored on such portable computer readable storage media and may be loaded onto persistent storage 408 via I/O interface(s) 414. I/O interface(s) 414 also can similarly connect to display 422. Display 422 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 5 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
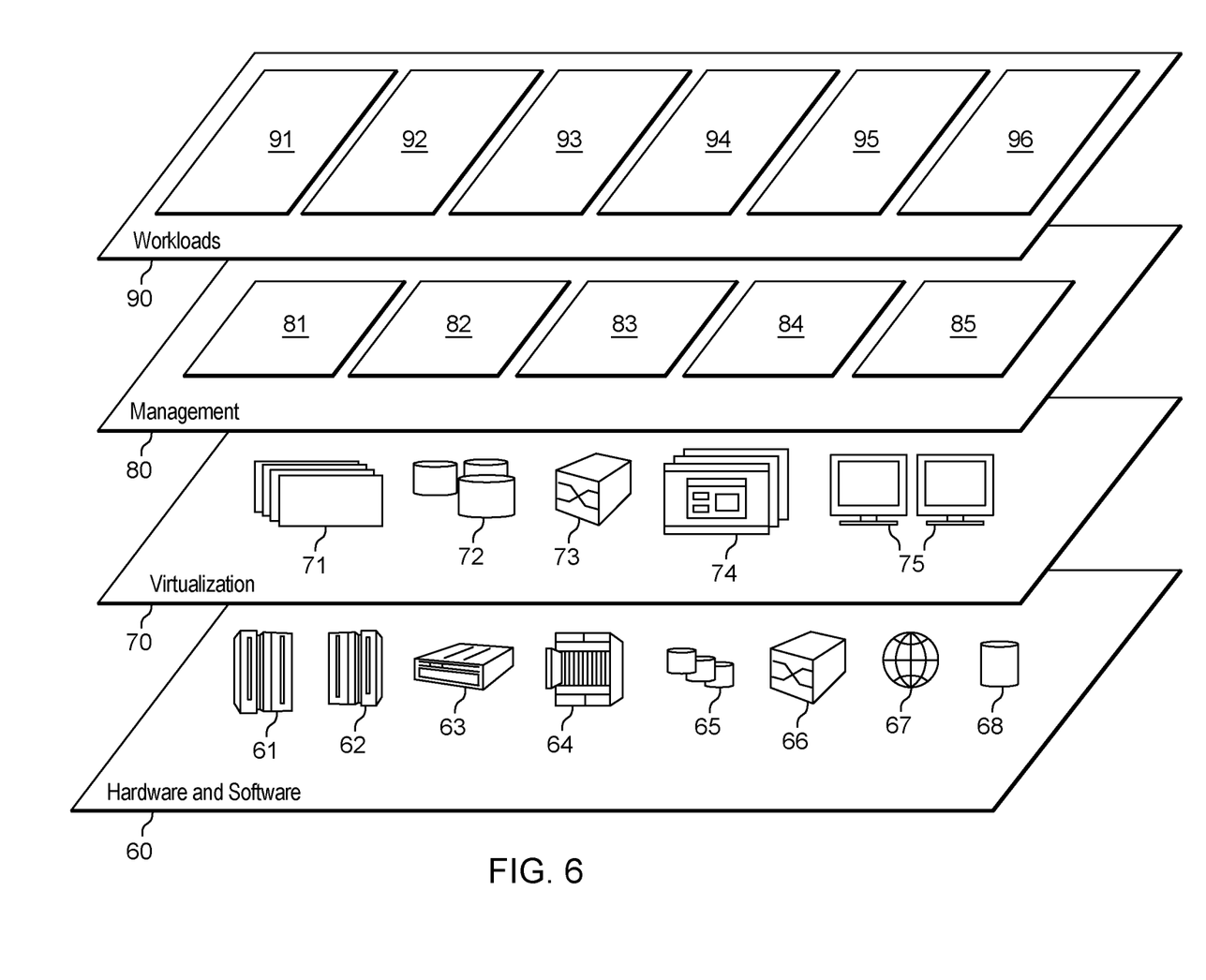
FIG. 6 is block diagram depicting a set of functional abstraction model layers provided by cloud computing environment 50 depicted in FIG. 5 in accordance with at least one embodiment of the present invention.

FIG. 6 is block diagram depicting a set of functional abstraction model layers provided by cloud computing environment 50 depicted in FIG. 5 in accordance with at least one embodiment of the present invention. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and digital fingerprint obfuscation 96.

What is claimed is:

1. A computer-implemented method for digital fingerprint obfuscation, the computer-implemented method comprising:
   sanitizing training data by stripping the training data of information that identifies source individuals, the source of training data being online user activity or synthetically generated online user activity;
   training a machine learning model using the training data to classify a user's real traffic data into one or more personas;
   collecting and marking a user's real traffic data to run classification algorithms to generate a base-persona, the base persona being main attributes connected to the user, the base persona having similar traits, likes, or dislikes from the user's real traffic data;
   identifying, using the trained machine learning model, a particular persona of a user based, at least in part, on a user's real traffic data generated during a current user session;

generating synthetic traffic data based, at least in part, on a different persona than the particular persona of the user identified using the trained machine learning model; and combining the user's real traffic data of the particular persona with the synthetic traffic data of the different persona to generate combined traffic data and plotting the combined traffic data as a traffic leveling graph to generate a visualization of the flattening of the user's traffic patterns.

2. The computer-implemented method of claim 1, further comprising:

transmitting the generated synthetic traffic data after the current user session has ended.

3. The computer-implemented method of claim 2, wherein transmitting the generated synthetic traffic data further comprises:

simultaneously transmitting the generated synthetic traffic data simultaneously with the real user traffic data generated during the current user session.

4. The computer-implemented method of claim 1, further comprising:

performing traffic leveling during the current user session, wherein performing traffic leveling includes transmitting the generated synthetic traffic data that is complementary to the user traffic data.

5. The computer-implemented method of claim 4, wherein traffic leveling is further based, at least in part, on an amount and persona of generated synthetic traffic data which is based, at least in part, on real traffic data.

6. The computer-implemented method of claim 1, wherein generating synthetic traffic is further based, at least in part, on:

generating a first score for the identified particular persona of the user;

determining a second persona and a second score for the second persona with a difference in the first score and the second score being above a predetermined threshold; and generating synthetic traffic data based, at least in part, on the second persona.

7. The computer-implemented method of claim 1, further comprising:

generating a first score for the identified particular persona of the user;

determining a second persona and a second score for the second persona with a difference in the first score and the second score being below a predetermined threshold; and generating synthetic traffic data based, at least in part, on the second persona.

8. The computer-implemented method of claim 1, wherein training the machine learning model to classify web traffic data into one or more personas is further based, at least in part on one or more of: active time of day of a user's web browsing history, web pages visited, web browsers accessed, applications accessed, and local contents present in the users' web browser or computer.

9. The computer-implemented method of claim 1, wherein generating synthetic traffic data is based, at least in part, on anonymizing a respective traffic pattern by traffic leveling using the synthetic traffic data to create a complimentary frequency of automated traffic to level an original traffic volume curve of a respective user plotted against time vs volume.

10. The computer-implemented method of claim 1, wherein generating synthetic traffic data is further based, at least in part on:

generating synthetic traffic data using the identified particular persona of the user to form a curated web surfing pattern based on a mixture of universal resource locators (URLs) accessed by users having different associated personas from the particular persona of the user.

11. A computer program product for digital fingerprint obfuscation, the computer program product comprising one or more computer readable storage media and program instructions stored on the one or more computer readable storage media, the program instructions including instructions to:

sanitize training data by stripping the training data of information that identifies source individuals, the source of training data being online user activity or synthetically generated online user activity;

train a machine learning model using the training data to classify web a user's real traffic data into one or more personas;

collect and mark a user's real traffic data to run classification algorithms to generate a base-persona, the base persona being main attributes connected to the user, the base persona having similar traits, likes, or dislikes from the user's real traffic data;

identify, using the trained machine learning model, a particular persona of a user based, at least in part, on a user's real traffic data generated during a current user session;

generate synthetic traffic data based, at least in part, on a different persona than the particular persona of the user identified using the trained machine learning model; and combine the user's real traffic data of the particular persona with the synthetic traffic data of the different persona to generate combined traffic data and plot the combined traffic data as a traffic leveling graph to generate a visualization of the flattening of the user's traffic patterns.

12. The computer program product of claim 11, further comprising instructions to:

transmit the generated synthetic traffic data after the current user session has ended.

13. The computer program product of claim 12, wherein the instructions to transmit the generated synthetic traffic data further comprises instructions to:

simultaneously transmit the generated synthetic traffic data simultaneously with the real user traffic data generated during the current user session.

14. The computer program product of claim 11, further comprising instructions to:

perform traffic leveling during the current user session, wherein performing traffic leveling includes transmitting the generated synthetic traffic data that is complementary to the user traffic data.

15. The computer program product of claim 14, wherein traffic leveling is further based, at least in part, on an amount and persona of generated synthetic traffic data which is based, at least in part, on real traffic data.

16. The computer program product of claim 11, wherein generating synthetic traffic is further based, at least in part, on instructions to:

generate a first score for the identified particular persona of the user;

determine a second persona and a second score for the second persona with a difference in the first score and the second score being above a predetermined threshold; and generate synthetic traffic data based, at least in part, on the second persona.

17. The computer program product of claim 11, further comprising instructions to:

generate a first score for the identified particular persona of the user;

determine a second persona and a second score for the second persona with a difference in the first score and the second score being below a predetermined threshold; and generate synthetic traffic data based, at least in part, on the second persona.

18. The computer program product of claim 11, wherein training the machine learning model to classify web traffic data into one or more personas is further based, at least in part on one or more of: active time of day of a user's web browsing history, web pages visited, web browsers accessed, applications accessed, and local contents present in the users' web browser or computer.

19. The computer program product of claim 11, wherein generating synthetic traffic data is based, at least in part, on anonymizing a respective traffic pattern by traffic leveling using the synthetic traffic data to create a complimentary frequency of automated traffic to level an original traffic volume curve of a respective user plotted against time vs volume.

20. A computer system for digital fingerprint obfuscation, comprising:

one or more computer processors;

one or more computer readable storage media;

computer program instructions;

the computer program instructions being stored on the one or more computer readable storage media for execution by the one or more computer processors; and the computer program instructions including instructions to:

sanitize training data by stripping the training data of information that identifies source individuals, the source of training data being online user activity or synthetically generated online user activity;

train a machine learning model using the training data to classify a user's real traffic data into one or more personas collect and mark a user's real traffic data to run classification algorithms to generate a base-persona, the base persona being main attributes connected to the user, the base persona having similar traits, likes, or dislikes from the user's real traffic data;

identify, using the trained machine learning model, a particular persona of a user based, at least in part, on a user's real traffic data generated during a current user session;

generate synthetic traffic data based, at least in part, on a different persona than the particular persona of the user identified using the trained machine learning model; and combine the user's real traffic data of the particular persona with the synthetic traffic data of the different persona to generate combined traffic data and plot the combined traffic data as a traffic leveling graph to generate a visualization of the flattening of the user's traffic patterns.

* * * * *